(12) United States Patent
Ye et al.

(10) Patent No.: US 8,707,234 B1
(45) Date of Patent: Apr. 22, 2014

(54) CIRCUIT NOISE EXTRACTION USING FORCED INPUT NOISE WAVEFORM

(71) Applicant: LSI Corporation, Milpitas, CA (US)

(72) Inventors: Lun Ye, Allentown, PA (US); Diwakar Ramadasu, Bangalore (IN); Shruthi Arun, Mysore (IN)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/672,999

(22) Filed: Nov. 9, 2012

(51) Int. Cl.
*G06F 17/50* (2006.01)

(52) U.S. Cl.
USPC ........... 716/115; 716/106; 716/108; 716/109; 716/110; 716/111

(58) Field of Classification Search
USPC .......................... 716/106–115, 132–135, 136
See application file for complete search history.

(56) References Cited

U.S. PATENT DOCUMENTS

| | | | |
|---|---|---|---|
| 6,675,118 B2 | 1/2004 | Wanek et al. | |
| 6,732,339 B2 | 5/2004 | Savithri et al. | |
| 6,826,736 B2* | 11/2004 | Wu et al. | 716/115 |
| 7,007,252 B2 | 2/2006 | Gyure et al. | |
| 7,263,676 B2* | 8/2007 | Gyure et al. | 716/113 |
| 7,284,212 B2 | 10/2007 | Varshney et al. | |
| 7,363,604 B2* | 4/2008 | Hill et al. | 716/136 |
| 7,886,257 B2* | 2/2011 | Yamaoka | 716/115 |
| 8,341,579 B2* | 12/2012 | Okamoto et al. | 716/115 |
| 2002/0133791 A1* | 9/2002 | Cohn et al. | 716/4 |
| 2003/0079191 A1* | 4/2003 | Savithri et al. | 716/4 |
| 2003/0145296 A1* | 7/2003 | Chandra et al. | 716/6 |
| 2004/0015339 A1 | 1/2004 | Wu et al. | |
| 2004/0205682 A1* | 10/2004 | Gyure et al. | 716/5 |
| 2006/0015831 A1* | 1/2006 | Varshney et al. | 716/4 |
| 2007/0044048 A1* | 2/2007 | Kameyama et al. | 716/4 |
| 2007/0079265 A1* | 4/2007 | Hill et al. | 716/5 |
| 2009/0007032 A1* | 1/2009 | Kariat et al. | 716/4 |
| 2009/0228851 A1* | 9/2009 | Abbaspour et al. | 716/6 |
| 2009/0254871 A1* | 10/2009 | Yamaoka | 716/4 |
| 2010/0169850 A1* | 7/2010 | Turner et al. | 716/4 |
| 2011/0276933 A1* | 11/2011 | Banerji et al. | 716/108 |
| 2011/0296369 A1* | 12/2011 | Okamoto et al. | 716/136 |
| 2012/0096421 A1* | 4/2012 | Ono et al. | 716/113 |
| 2012/0131532 A1* | 5/2012 | Hegazy | 716/115 |

OTHER PUBLICATIONS

Wolfgang Roethig, "Library Characterization and Modeling for 130nm and 90nm SoC Design," IEEE SoC Conference, Sep. 2003, 29 pages, NEC Electronics America.

"Synopsys PrimeTime SI—The Signal Integrity Sign-Off Solution," Synopsys, 2007, 3 pages.

* cited by examiner

*Primary Examiner* — Nha Nguyen
(74) *Attorney, Agent, or Firm* — Ryan, Mason & Lewis, LLP

(57) ABSTRACT

Techniques for use in integrated circuit design systems for extracting noise threshold data for selected cells. For example, a method comprises the following steps. A cell is selected from one or more cells in a given collection of standardized cells. Each of the one or more cells represents one or more functional circuit design blocks that are usable as part of a design of an integrated circuit. A noise signal is generated or selected. The noise signal is applied to an input node of the selected cell. Noise threshold data is identified using a noise analysis module, for a given set of process, voltage and temperature variations, for an output node of the selected cell based on the noise signal applied to the input node of the selected cell. The noise threshold data is stored with the selected cell as part of the given collection of standardized cells such that the noise threshold data is subsequently usable during a post layout noise analysis operation of an integrated circuit design that includes the selected cell.

20 Claims, 7 Drawing Sheets

```
set_input_noise -above -low  -height 0.7650 -width 10000 x_tsmc_cln28hp_scui31d_fast_125c_0p935v_A0I22X1RV0UI31D/A
set_input_noise -below -high -height 0.7650 -width 10000 x_tsmc_cln28hp_scui31d_fast_125c_0p935v_A0I22X1RV0UI31D/A
```

FIG. 6B

```
*****************************************
Report : noise
      -slack_type height
      -slack_lesser_than 999.90
      -verbose
      -nosplit
Design : x_tsmc_cln28hp_scui31d_fast_125c_0p935v
Version: D-2010.06-SP1
Date : Thu Oct 18 14:40:09 2012
*****************************************
analysis mode: report_at_source
slack type: height noise_region: above_low
pin name (net name)          width      height    slack
----------------------------------------------
x_tsmc_cln28hp_scui31d_fast_125c_0p935v_AOI22X1RV0UI31D/
A (p_tsmc_cln28hp_scui31d_fast_125c_0p935v_AOI22X1RV0UI31D_A)
Aggressors:
Propagated:
p_tsmc_cln28hp_scui31d_fast_125c_0p935v_AOI22X1RV0UI31D_A 10000.0000  0.7650
Total:                       10000.0000   0.7650   -0.3732 noise_region: below_high
pin name (net name)          width      height    slack
----------------------------------------------
x_tsmc_cln28hp_scui31d_fast_125c_0p935v_AOI22X1RV0UI31D/
A (p_tsmc_cln28hp_scui31d_fast_125c_0p935V_AOI22X1RV0UI31D_A)
Aggressors:
Propagated:
p_tsmc_cln28hp_scui31d_fast_125c_0p935v_AOI22X1RV0UI31D_A 10000.0000  0.7650
Total:                       10000.0000   0.7650   -0.5311
```

CIRCUIT NOISE EXTRACTION USING FORCED INPUT NOISE WAVEFORM

BACKGROUND

In the design of integrated circuits, it is known that designers typically utilize one or more libraries of functional blocks, commonly known as "cells," to design circuits to be formed with semiconductor devices as part of one or more such integrated circuits. These libraries of cells are available to the designer via a computer system, commonly known as a "computer aided design" (CAD) system, and allow the designer to design circuits on a computer display screen simply by selecting particular cells from the libraries and placing them in a visual schematic representation of the proposed circuit on the display screen.

These cells are typically standardized in that they have known electrical characteristics such as, for example, propagation delay, capacitance and inductance. Moreover, the cells are a pre-characterized collection of circuit elements (e.g., logic gates such as NAND, NOR, inverters, etc.). This allows the designer to design, with a reasonable degree of confidence, an integrated circuit that performs certain desired functions within specific operational constraints. Such standard cell design is thus able to achieve very high gate density while also achieving desired electrical performance.

As is also known, noise in a given circuit is considered to be an unwanted variation in voltage or current at some evaluation node of the given circuit. In the case of a standard cell design, the evaluation node may be an output of a standard cell. In a digital design, for example, noise can typically affect a static signal in one of four ways: (1) noise above a logic level zero (0) signal is commonly known as "rise noise;" (2) noise below a logic level 0 signal is commonly known as "undershoot noise;" (3) noise above a logic level one (1) signal is commonly known as "overshoot noise;" and (4) noise below a logic level 1 signal is commonly known as "fall noise."

Noise in circuits can come from various sources, for example, charge sharing, supply, leakage noise, crosstalk and propagated noise. With technology scaling, particularly at the deep sub-micron level, noise in circuits is becoming more significant due to factors such as lower supply voltage, higher interconnect densities, faster clock rates, more aggressive use of high-performance circuit families, and scaling of threshold voltages.

Thus, characterization of noise is very important during the early design cycle in order to ensure correct placement of circuit elements and signal routing prior to fabrication of an actual integrated circuit.

SUMMARY

Embodiments provide techniques for use in integrated circuit design systems for extracting noise threshold data for selected cells.

In one embodiment, a method comprises the following steps. A cell is selected from one or more cells in a given collection of standardized cells. Each of the one or more cells represents one or more functional circuit design blocks that are usable as part of a design of an integrated circuit. A noise signal is generated or selected. The noise signal is applied to an input node of the selected cell. Noise threshold data is identified using a noise analysis module, for a given set of process, voltage and temperature variations, for an output node of the selected cell based on the noise signal applied to the input node of the selected cell. The noise threshold data is stored with the selected cell as part of the given collection of standardized cells such that the noise threshold data is subsequently usable during a post layout noise analysis operation of an integrated circuit design that includes the selected cell.

In another embodiment, a method comprises the following steps. A test circuit is created comprising one or more selected cells from a given library comprising a plurality of cells. Each of the plurality of cells in the given library represents a functional circuit design block that is usable as part of a design of an integrated circuit. For each of the one or more selected cells in the test circuit: a noise signal is applied to an input of the selected cell; noise threshold data is extracted using a noise analysis module, for a given set of process, voltage and temperature variations, for the selected cell in response to the application of the noise signal; and the noise threshold data is stored with the selected cell such that the noise threshold data is subsequently usable as a predetermined noise margin associated with the selected cell during a post layout noise analysis operation of an integrated circuit design that includes the selected cell.

Alternate embodiments provide other implementations of noise threshold data extraction using a noise analysis module in order to improve an integrated circuit design process.

BRIEF DESCRIPTION OF THE DRAWINGS

FIG. 6B is a diagram showing a noise report according to an embodiment of the invention.

DETAILED DESCRIPTION

Figure 1:
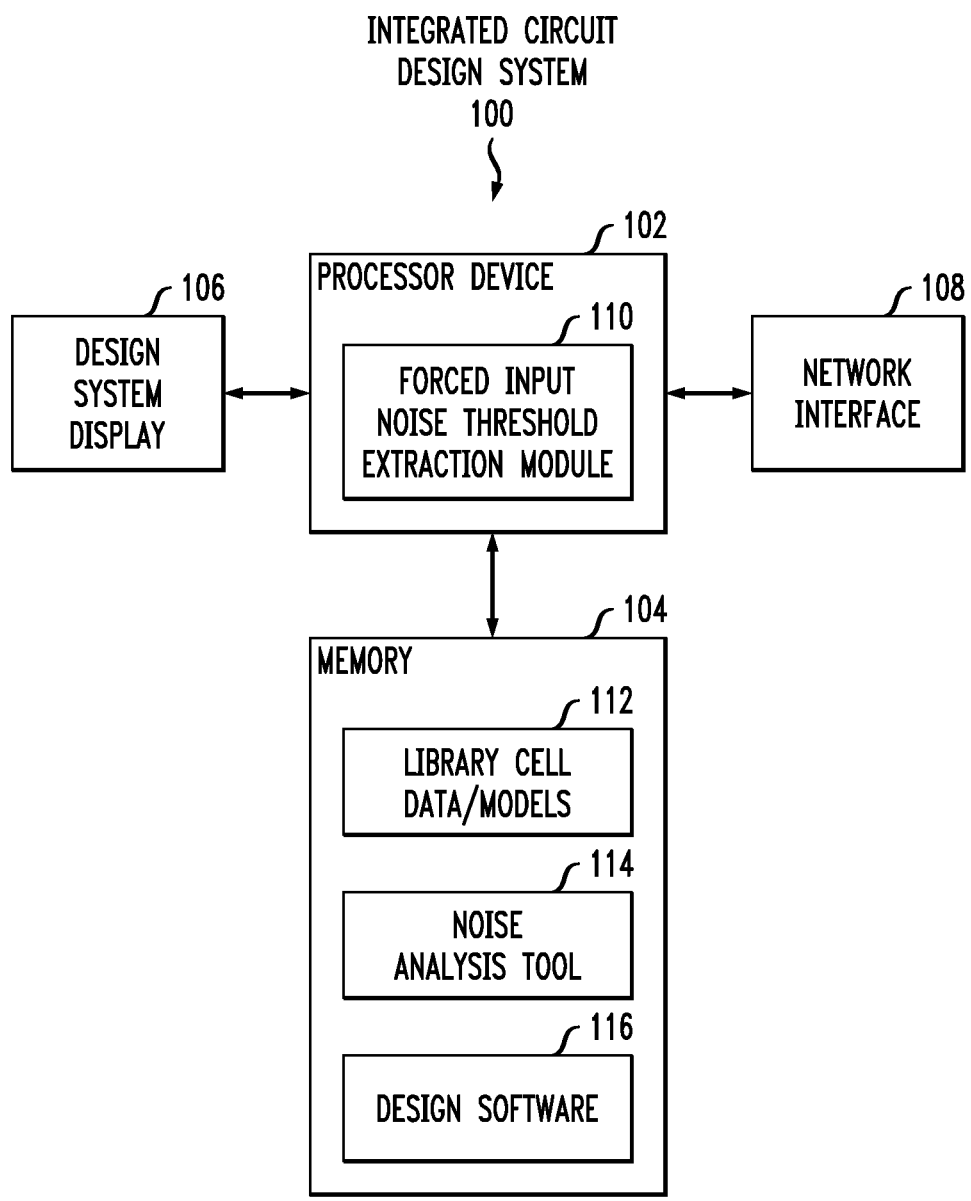
FIG. 1 is a diagram showing an integrated circuit design system with forced input noise threshold extraction functionality according to an embodiment of the invention.

Embodiments of the invention will be illustrated herein in conjunction with exemplary integrated circuit design systems and corresponding cell libraries used for standardized design of circuits implemented in an integrated circuit. It should be understood, however, that embodiments of the invention are more generally applicable to any integrated circuit design systems in which it would be desirable to improve the noise threshold data extraction process.

"Noise threshold data," as used herein refers to data (e.g., parameters or values) that specifies one or more noise threshold levels over which noise present in a circuit adversely affects, or could adversely affect, the operation of one or more circuit functions or features. This is important to know for an integrated circuit designer so that the designer can make intelligent design choices (e.g., timing and/or cell selection) that account for such one or more noise threshold levels.

Characterization and modeling of noise in an integrated circuit design is important to the success of a given design since an integrated circuit design cannot typically be physically prototyped ("bread-boarded") and tested as is the case with discrete electronic component designs. Thus, integrated circuit simulation software programs such as HSPICE® (Synopsys, Inc. of Mountain View, Calif.) are extensively used to characterize circuit noise. Simulation programs such as HSPICE® operate at the transistor or device level, and run complex signal simulation scenarios on a subject circuit of an integrated circuit (created in the simulation environment) measuring cross-coupled noise in different parts of the circuit. Cross-coupled noise is noise measured in one part or signal path of the circuit that is typically caused by noise or signal propagation in another part or signal path of the circuit. This measured cross-coupled noise is modeled by the simulation software and used to determine noise threshold data across a set of process, voltage and temperature (PVT) corners for cells in a given library. PVT "corners" refer to the extremes of variations of these parameters (process, voltage, temperature) within which a circuit that is to be fabricated as part of an integrated circuit should function properly. This noise threshold data is then used in subsequent integrated circuit design steps such as, for example, a design implementation noise prevention flow application and a design noise signoff flow application.

However, it is known that simulation programs such as HSPICE® are both time-intensive and user-intensive, and further typically require the acquisition of a license to execute the simulation software package. Furthermore, this existing simulation-based method for extracting cell noise threshold data requires that a library cell transistor-level net-list be available in order to execute transistor-level circuit analysis. This existing method also requires that the individuals operating the transistor-level simulations have gate-level circuit stimulus knowledge in order to perform certain characterization tasks. In addition, this existing method requires the existence of foundry device models to perform transistor-level circuit analysis in order to extract the cell noise threshold data. Still further, there can be mismatches of device models used by timing/noise model characterization operations and by noise threshold simulation operations performed by the simulation software, since these two tasks are performed by different individuals, at different times.

As will be described in further detail herein, techniques are provided in accordance with embodiments of the invention for extracting cell noise threshold data for library cells by using a forced input noise waveform approach. The forced input noise waveform approach eliminates a need for standalone, transistor-level or device-level simulation programs, such as HSPICE® and the like, to extract cell noise threshold data. That is, the forced input noise waveform embodiments described herein solve, inter alia, the prohibitive problems of extensive execution time, extensive computing resources, and intensive man-power, attributable to transistor-level simulations. Such embodiments of the invention also eliminate the need to create complicated circuit stimulus for the simulations, as mentioned above, that can require approximately 20 hours for each library PVT corner. While the forced input noise waveform approach described herein is widely applicable across many integrated circuit technology platforms, such an approach is particularly suitable for extraction of noise threshold data for cells in 28 nanometer (nm) and 40 nm technology libraries, i.e., so-called deep sub-micron integrated circuit design.

FIG. 1 is a diagram showing an integrated circuit design system with forced input noise threshold extraction functionality according to an embodiment of the invention. As shown, system 100 includes a processor device 102 coupled to a memory 104, and a display 106. The system 100 also includes a network interface 108 for permitting system 100 to communicate with other systems and devices over one or more networks. In one embodiment of the invention, network interface 108 comprises one or more transceivers. The processor device 102 implements a forced input noise threshold extraction module 110 for the determination of cell noise threshold data in an integrated circuit design in the manner disclosed herein. The processor device 102 also utilizes integrated circuit design software 116. Design software 116 includes other functions and operations of an integrated circuit design system which are not the focus of embodiments of the invention and thus are not further described herein. Module 110 utilizes library cell data/models 112 and noise analysis tool (module) 114 in the noise threshold data extraction operations. These operations will be further described below in the context of FIGS. 2 through 7.

Elements such as 110, 112, 114 and 116 are implemented at least in part in the form of software stored in memory 104 and processed by processor device 102. For example, the memory 104 may store program code that is executed by the processor device 102 to implement the noise threshold data extraction functionality of module 110 within an overall integrated circuit design process. The memory 104 is an example of what is more generally referred to herein as a computer-readable storage medium or other type of computer program product having computer program code embodied therein, and comprises, for example, electronic memory such as RAM or ROM, magnetic memory, optical memory, or other types of storage devices in any combination. The processor device 102 comprises a microprocessor, a central processing unit (CPU), an application specific integrated circuit (ASIC), a field programmable gate array (FPGA) or other type of processing device, as well as portions or combinations of such devices.

In general, forced input noise threshold extraction module 110 forces or applies a noise signal on the input pin of a given cell from a given library of cells. After the noise signal is forced on the input pin, a noise report is generated using noise analysis tool 114. One example of a noise analysis tool is PrimeTime SI® (Synopsys, Inc. of Mountain View, Calif.), although alternative embodiments employ other suitable noise analysis systems. The noise threshold data is then obtained from the noise report.

The forced input noise threshold extraction method requires no transistor-level circuit simulation, resulting in a run-time speed up of, for example, over 200 times. The method also requires no gate-level circuit stimulus creation, resulting in simplified design setup steps and requirements. In the forced input noise threshold extraction method, a circuit description is created specifically for the purpose of rapid generation of library cell input pin noise threshold data. Further, instead of analyzing the circuit to determine the noise level, one or more pre-determined noise signals are forced onto a cell input pin in the circuit for the purpose of obtaining noise threshold data. The noise analysis and reporting program is a high-level tool (e.g., PrimeTime SI® or the like) that does not perform transistor-level circuit simulation using foundry device models, as is the case with tools such as HSPICE®. The noise threshold data generated in this method is then formatted either as PVT and cell/pin specific threshold data for PVT-specific applications, or as worst-of-all (worst case) noise threshold data for a noise prevention application during integrated circuit implementation.

Figure 2:
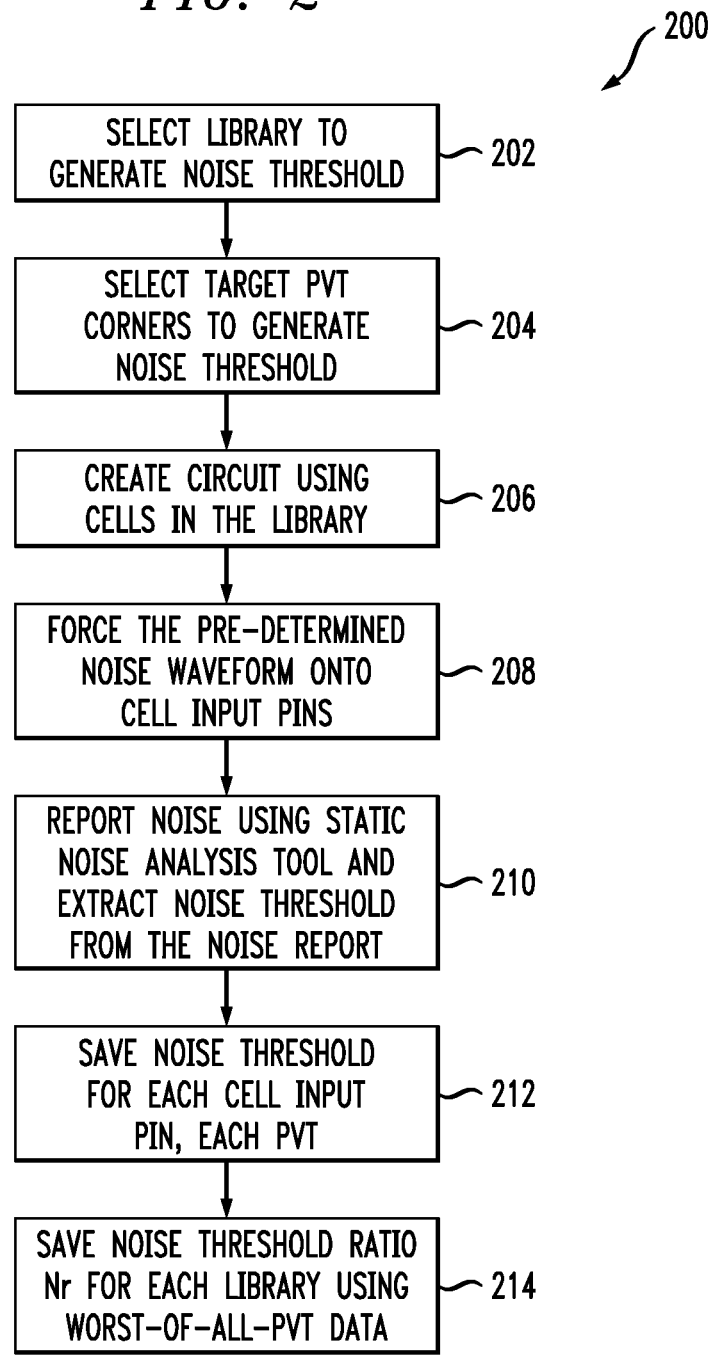
FIG. 2 is a diagram showing a forced input noise threshold extraction methodology for integrated circuit design according to an embodiment of the invention.

FIG. 2 illustrates an embodiment of the invention that is a forced input noise threshold extraction method 200. It is to be understood that method 200 is performed by module 110 in FIG. 1 in conjunction with processor device 102, memory 104, display 106, and network interface 108 (when needed).

In step 202, the method 200 first selects the cell library for which noise threshold data is to be extracted. Indication of which cell library is to be selected in step 202 is specified by a designer or individual involved in the design process. In an alternative embodiment, some portion of the integrated design system software 116, or some other design system or computer system, provides the indication of which cell library to select.

In step 204, the method 200 selects the target PVT corners for which to generate noise threshold data. Again, indication of the PVT corners to be selected is by an individual or a system.

In step 206, the method 200 enables creation of a test circuit using one or more cells from the cell library selected in step 202. The creation of the test circuit is performed in accordance with display 106 and one or more input/output devices (not shown), such as a keyboard or mouse or some other pointing/selection device, coupled to processor device 102. As in typical CAD systems, a user calls up a visual listing of cells of a particular library, clicks on one of the cells, and drags the cell to a circuit layout area on the display screen, thereby creating a test circuit.

Figure 3:
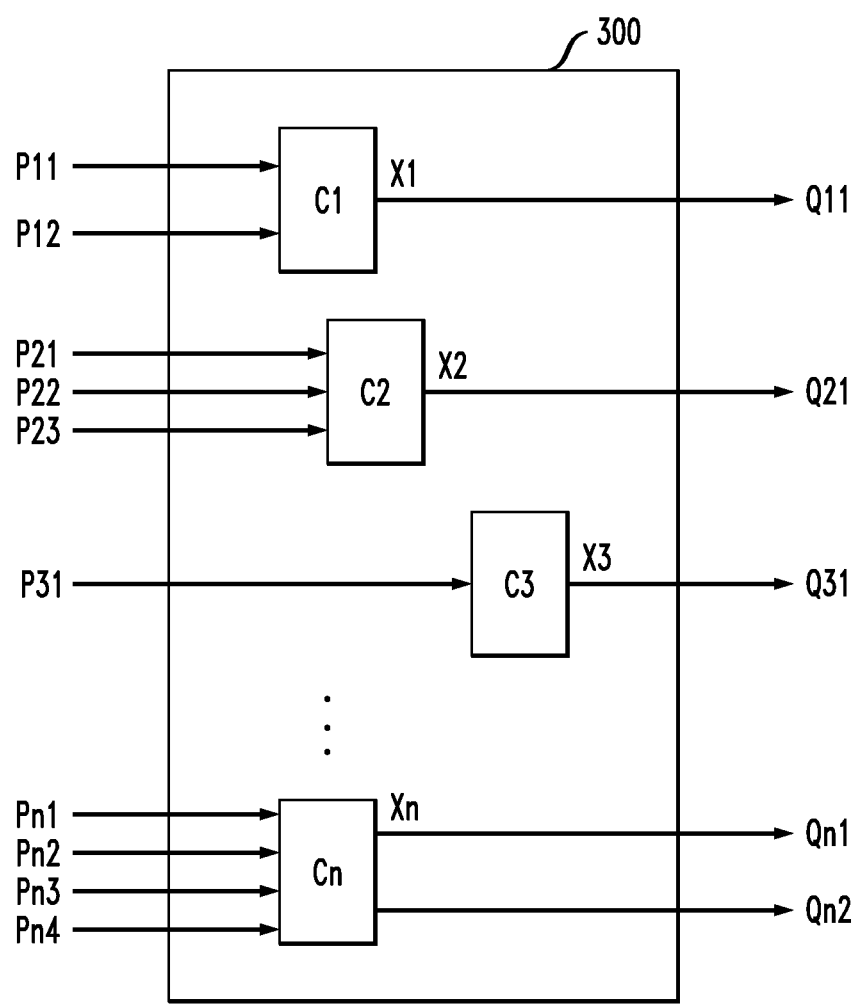
FIG. 3 is a diagram showing a test circuit according to an embodiment of the invention.

An example of a test circuit is illustrated in FIG. 3 according to an embodiment of the invention. As shown, test circuit 300 includes multiple cells C1, C2, C3, ..., Cn, where n is the total number of cells in the circuit created. Recall that cells C1, C2, C3, ..., Cn respectively represent circuit elements (e.g., logic gates such as NAND, NOR, inverters, etc.) that are usable in an integrated circuit design. Thus, for the library selected in step 202 and for a set of desired PVT corners for which noise threshold data is needed/desired, circuit 300 is created using library cells C1, C2, C3, ..., Cn. In this example: cell C1 includes two input pins P11 and P12, and one output pin Q11; cell C2 includes three input pins P21, P22 and P23, and one output pin Q21; cell C3 includes one input pin P31 and one output pin Q31; and cell Cn includes four input pins Pn1, Pn2, Pn3 and Pn4, and two output pins Qn1 and Qn2. Note that each input pin of a cell is considered a signal node or port, while output pins are considered output nodes or ports. Also, since each cell represents a generic circuit element selected from the cell library, once the cell is placed in the circuit layout, it is assigned a unique cell instance designator, i.e., C1 is assigned cell instance X1, cell C2 is assigned cell instance X2, cell C3 is assigned cell instance X3, and cell Cn is assigned cell instance Xn.

Circuit 300 is then loaded into a noise analysis tool (114 in FIG. 1) such as PrimeTime SI®. In addition to the circuit 300, library model files (known as Composite Current Source or CCS liberty models) are also loaded into the noise analysis tool 114. These CCS models are pre-existing models that respectively correspond to each cell in the selected cell library. Such models are represented in the FIG. 1 design system as library cell data/models 112. Thus, the CCS models that correspond to cells C1, C2, C3, ..., Cn are obtained from 112 and loaded into noise analysis tool 114 along with test circuit 300.

Figure 4:
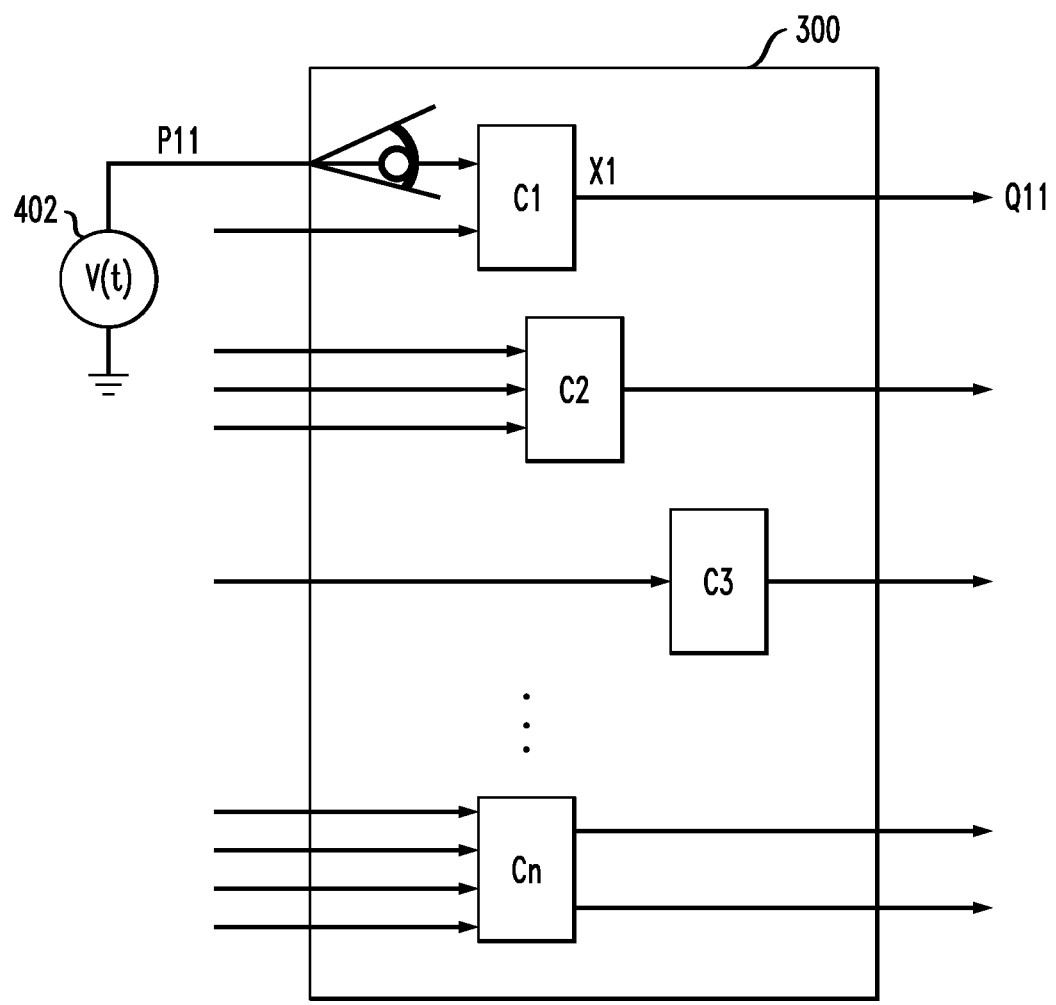
FIG. 4 is a diagram showing the test circuit of FIG. 3 with a noise signal applied to an input node of a selected cell according to an embodiment of the invention.

In step 208, a pre-determined noise signal is forced onto one or more of the cell input pins in circuit 300. FIG. 4 illustrates an example where a noise signal is forced onto input pin P11 of cell instance X1 of circuit 300. In this example, the forced noise signal on input pin P11 is represented by a voltage waveform function, V(t), directly applied to the input pin.

The voltage waveform function V(t) illustrated in FIG. 4 is represented by a forced input noise voltage source 402. This forced input noise voltage source can be a constant voltage source, or a time-varying voltage source. In the case when the source V(t) is a constant voltage, representing a noise of infinite width, the noise threshold data obtained by method 200 is referred to as static noise threshold data. If the voltage source V(t) is a time-varying voltage source, the noise threshold data is a function of the forced input noise amplitude and the forced input noise duration. In this case, the noise threshold data obtained is referred to as a noise rejection curve or a noise immunity curve. In either case, the forced input noise signal can be generated at the time of application, or otherwise obtained from a predetermined set of voltage waveform functions.

Figures 5, 6A:
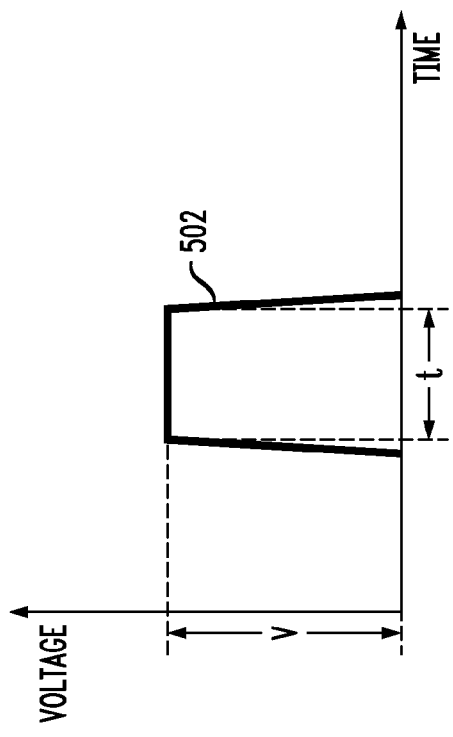
FIG. 5 is a diagram showing a graphical representation of a noise signal according to an embodiment of the invention.
FIG. 6A is a diagram showing noise assignment commands according to an embodiment of the invention.

FIG. 5 illustrates an example of forced input noise signal 502. In the figure, V denotes the forced input noise voltage amplitude, while t denotes the forced input noise time duration. When such a noise signal is forced onto an input pin of a library cell, if the noise signal amplitude V is a fixed value (such as, for example, the value of a power supply for the cell), and the noise signal duration t is sufficiently large so that it has the effect of applying a direct current (DC) voltage level to the cell input pin, the noise threshold value is considered a static noise threshold. As will be explained below in the context of FIG. 7, the noise threshold data extraction method is also capable of extracting a noise immunity curve based on the input noise signal.

Returning to FIG. 2, in step 210, the method 200 reports the noise on the output pin(s) of the cell to which the forced input noise is applied. Such a noise report is obtained from noise analysis tool 114. For example, a noise report is obtained for pin Q11 of cell instance X1 in FIG. 4. Then, from the noise report, noise threshold data is obtained for that particular cell input pin. In this example, noise threshold data is obtained for input pin P11 of cell instance X1. That is, with the noise waveform V(t) forced onto input pin P11 of instance cell X1 of the library cell C1, the noise report is obtained for the input pin P11 of X1, and the noise threshold data is obtained from the report.

In an embodiment of the invention where noise threshold tool 114 is PrimeTime SI®, noise threshold data is obtained as follows. Along with test circuit (e.g., 300 in FIG. 3), the corresponding CCS liberty models (e.g., 112 in FIG. 1) are read into PrimeTime SI®. In PrimeTime SI®, instead of performing a noise analysis to find out how much cross-coupled noise a cell pin has associated therewith (i.e., the typical usage of the noise analysis tool), a noise pulse of a given amplitude (e.g., VDD) is forced on the input pin. After forcing a noise signal on the input pin, a noise report is generated. In the "Report at Source" mode, when PrimeTime SI® detects a functional failure caused by a noise bump, it does not propagate the incorrect logic value forward through the path. PrimeTime SI® reduces the size of the input noise bump to a fraction of the failure level so that noise analysis can continue for cells and nets in the fan out of the failure. This reduced noise bump amplitude is considered to be the noise margin of the pin. The noise margin data is obtained by examining the noise report. The noise margin data is the modulated noise immune region values determined by PrimeTime SI®.

FIG. 6A shows a set of noise assignment commands that is used to force input noise on a given pin of a cell in accordance with an embodiment that utilizes PrimeTime SI® as the noise analysis tool 114. FIG. 6B shows a noise report generated in PrimeTime SI® based on the set of noise assignment commands from FIG. 6A. In this example, the forced input noise pulse (signal) peak value is 0.765 volts (v), with a duration of 10,000 nanoseconds (ns), i.e., basically a DC noise of 0.765v. The above_low noise slack is −0.3732v, so the noise threshold value determined from applying the forced 0.765v/10,000 ns input noise on pin A of library cell AO122X1RV0UI31D is (for above_low or the rise noise case):
Vt=0.7650v+(−0.3732v)=0.3918v
Wt=10,000 ns
Similarly, the fall noise threshold value is Vt=0.7650v+ (−0.5311v)=0.2339v, Wt=10,000 ns.

Figure 7:
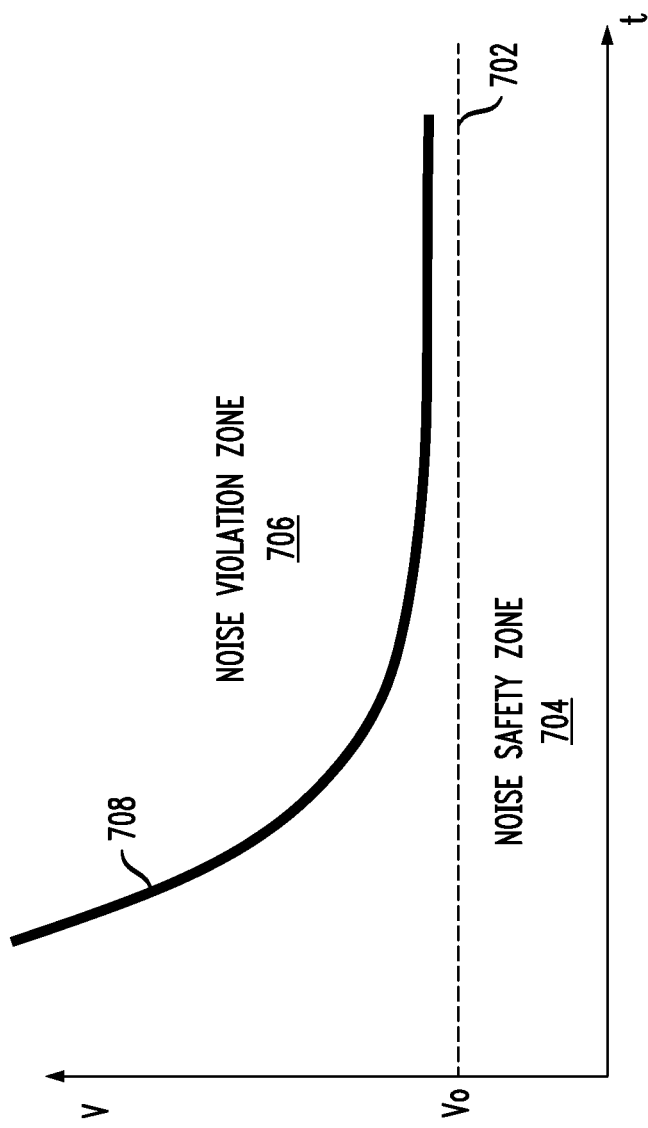
FIG. 7 is a diagram showing a graphical representation of noise threshold data according to an embodiment of the invention.

In FIG. 7, the static noise threshold Vo (represented as horizontal line 702) is the noise threshold when assuming the noise duration is infinitely long. When a forced input noise (V, t) does not cause a noise violation, it results in a noise point (v, t) in the noise safety zone 704. When a forced input noise (v, t) does cause a noise violation, it results in a noise point (v, t) in the noise violation zone 706. By enumerating the (v, t) points and creating an envelope curve 708, a noise immunity curve is obtained.

So assuming FIG. 7 represents the noise threshold data yielded from the PrimeTime SI® noise report in FIG. 6B, the horizontal Vo line (702) is located at 0.3918v (since the 10,000 ns wide noise pulse effectively results in x=+infinite). If it is assumed that 0.765v is used for the forced input noise pulse peak value and relatively small noise pulse duration values, e.g., Wt=0.010 ns, Wt=0.020 ns, . . . , are used, the forced input noise threshold extraction method yields curve 708 in FIG. 7 (after connecting the resulting (Vt, Wt) pairs). In general, the wider the noise pulse duration, the lower the noise threshold value.

Thus, the Vt values are obtained for a pin for a given set of PVT variations (e.g., corners). For example: process variations typically include fast, slow, slow2s, fast1s, etc.; supply voltage variations are dependent on the technology of the subject circuit and intended circuit operating condition; and circuit operating temperature variations typically include −40 degrees Celsius (C), 25 C., 125 C., etc. Then, the numerical ratio of the noise threshold Vt over a library characterization supply voltage Vddv is calculated as follows:

$$Nr=Vt/Vddv$$

Since under different library characterization conditions (PVT variations), Vddv and circuit performance is different, resulting in different Vt values, the forced input noise threshold extraction method then obtains the lowest Nr values for a pin across all the different library characterization conditions (worst-of-all value) and uses this Nr value as the noise threshold value for the pin. Notice that this Nr value can be obtained either using Vt values from finite noise pulse durations (hence, obtaining a worst-of-all curve) or using an infinite noise pulse duration (hence, obtaining a worst-of-all line).

Returning again to FIG. 2, step 212 saves the noise threshold data determined, as explained above, for a given set of PVT corners for each cell input pin upon which a noise signal is forced. Step 214 saves a noise threshold ratio Nr for the library selected in step 202 for worst-of-all (worst case) PVT data.

The noise threshold data stored in steps 212 and 214 is stored in the cell library with the cell to which the data corresponds. For example, the cell noise threshold data extracted in accordance with method 200 is stored with the library cell data/models 112 in the FIG. 1 design system. In this manner, the noise threshold data is subsequently usable as a predetermined noise margin associated with the selected cell during a post layout noise analysis of an integrated circuit design that includes the selected cell, e.g., a design implementation noise prevention flow application and a design noise signoff flow application.

As has been illustratively explained herein, the forced input noise threshold data extraction approach provides the following exemplary features. A circuit is created using library cells to be analyzed in a tool that is at a higher design level than HSPICE® provides, such as PrimeTime SI® or a similar tool. No transistor-level simulation is needed to generate the noise threshold for library cells. No device models from an integrated circuit foundry are needed to generate the noise threshold data for library cells. Only the library models released for synthesis, static timing analysis and noise analysis are used to generate the noise threshold data for library cells. The method uses a forced input noise signal approach to generate noise threshold data, instead of relying on computing the induced noise on the pin due to parasitic cross coupling capacitors.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method comprising:
selecting a cell from one or more cells in a given collection of standardized cells, wherein each of the one or more cells represents one or more functional circuit design blocks usable as part of a design of an integrated circuit;
one of generating and selecting a noise signal;
applying the noise signal to an input node of the selected cell;
identifying noise threshold data using a noise analysis module, for a given set of process, voltage and temperature variations, for an output node of the selected cell based on the noise signal applied to the input node of the selected cell, wherein the noise analysis module performs the noise threshold data identification at an analysis level higher than that of a transistor-level and device-level circuit simulation; and
storing the noise threshold data with the selected cell as part of the given collection of standardized cells such that the noise threshold data is subsequently usable during a post layout noise analysis operation of an integrated circuit design that includes the selected cell;
wherein one or more of the above steps are performed via a processing device.

2. The method of claim 1, further comprising the step of determining a noise threshold ratio for the selected cell.

3. The method of claim 2, wherein the noise threshold ratio is determined for a worst-case set of process, voltage and temperature variations.

4. The method of claim 1, wherein the noise signal represents a constant voltage source.

5. The method of claim 4, wherein the noise threshold data comprises a static noise threshold value.

6. The method of claim 1, wherein the noise signal represents a time-varying voltage source.

7. The method of claim 6, wherein the noise threshold data comprises a noise immunity curve.

8. The method of claim 1, further comprising the steps of selecting a cell, one of generating and selecting a noise signal, applying the noise signal, identifying noise threshold data, and storing the noise threshold data for each of the other cells in the given collection of standardized cells.

9. A computer program product comprising non-transitory computer-readable storage medium having computer program code embodied therein for use in designing an integrated circuit, wherein the computer program code when executed in an integrated circuit design system causes the integrated circuit design system to perform the steps of claim 1.

10. A method comprising:
  creating a test circuit comprising one or more selected cells from a given library comprising a plurality of cells, each of the plurality of cells in the given library representing a functional circuit design block usable as part of a design of an integrated circuit;
  for each of the one or more selected cells in the test circuit:
    applying a noise signal to an input of the selected cell;
    extracting noise threshold data using a noise analysis module, for a given set of process, voltage and temperature variations, for the selected cell in response to the application of the noise signal, wherein the noise analysis module performs the noise threshold data extraction at an analysis level higher than that of a transistor-level and device-level circuit simulation; and
    storing the noise threshold data with the selected cell such that the noise threshold data is subsequently usable as a predetermined noise margin associated with the selected cell during a post layout noise analysis operation of an integrated circuit design that includes the selected cell;
  wherein one or more of the above steps are performed via a processing device.

11. The method of claim 10, further comprising obtaining a model associated with each selected cell.

12. The method of claim 11, wherein the test circuit and the model for each selected cell are input to the noise analysis module, in accordance with which the noise signal is applied and the noise threshold data is extracted for each selected cell in the test circuit.

13. The method of claim 11, wherein the model associated with the selected cell is a model characterizing parameters having a level higher than transistor-level parameters and device-level parameters.

14. The method of claim 13, wherein the parameters of the model of the selected cell comprise one or more of functionality, timing, noise, power and other information associated with the selected cell for use in one or more of integrated circuit implementation, integrated circuit timing analysis operation, integrated circuit noise analysis operation, integrated circuit power analysis operation.

15. A computer program product comprising non-transitory computer-readable storage medium having computer program code embodied therein for use in designing an integrated circuit, wherein the computer program code when executed in an integrated circuit design system causes the integrated circuit design system to perform the steps of claim 10.

16. A system comprising:
  a memory; and
  a processing device operatively coupled to the memory and configured to:
  enable selection of a cell from one or more cells in a given collection of standardized cells, wherein each of the one or more cells represents one or more functional circuit design blocks usable as part of a design of an integrated circuit;
  enable one of generation and selection of a noise signal;
  apply the noise signal to an input node of the selected cell;
  identify noise threshold data using a noise analysis module, for a given set of process, voltage and temperature variations, for an output node of the selected cell based on the noise signal applied to the input node of the selected cell, wherein the noise analysis module performs the noise threshold data identification at an analysis level higher than that of a transistor-level and device-level circuit simulation; and
  store the noise threshold data with the selected cell as part of the given collection of standardized cells such that the noise threshold data is subsequently usable during a post layout noise analysis of an integrated circuit design that includes the selected cell.

17. The system of claim 16, wherein the processing device is further configured to determine a noise threshold ratio for the selected cell.

18. The system of claim 17, wherein the noise threshold ratio is determined for a worst-case set of process, voltage and temperature variations.

19. The system of claim 16, wherein the noise signal represents a constant voltage source, and the noise threshold data comprises a static noise threshold value.

20. The system of claim 16, wherein the noise signal represents a time-varying voltage source, and the noise threshold data comprises a noise immunity curve.

* * * * *